United States Patent
DeLuca et al.

(10) Patent No.: US 9,548,942 B2
(45) Date of Patent: *Jan. 17, 2017

(54) LINKING INSTANCES WITHIN A CLOUD COMPUTING ENVIRONMENT

(71) Applicant: International Business Machines Corporation, Armonk, NY (US)

(72) Inventors: Lisa Seacat DeLuca, Baltimore, MD (US); Brian D. Goodman, West Redding, CT (US); Troy M. Volin, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,490

(22) Filed: Feb. 23, 2015

(65) Prior Publication Data

US 2015/0172212 A1    Jun. 18, 2015

Related U.S. Application Data

(63) Continuation of application No. 12/887,773, filed on Sep. 22, 2010, now Pat. No. 9,043,445.

(51) Int. Cl.
  *G06F 15/16*   (2006.01)
  *H04L 12/911*   (2013.01)
  *G06F 9/50*   (2006.01)

(52) U.S. Cl.
  CPC ............ *H04L 47/78* (2013.01); *G06F 9/5077* (2013.01)

(58) Field of Classification Search
  None
  See application file for complete search history.

(56) References Cited

U.S. PATENT DOCUMENTS

| | | |
|---|---|---|
| 7,562,254 B2 | 7/2009 | Davis et al. |
| 7,660,748 B2 | 2/2010 | Archer et al. |
| 2003/0051021 A1 | 3/2003 | Hirschfeld et al. |
| 2003/0149880 A1 | 8/2003 | Shamsaasef et al. |
| 2008/0091763 A1 | 4/2008 | Devonshire et al. |
| 2009/0036111 A1 | 2/2009 | Danford et al. |
| 2009/0077090 A1 | 3/2009 | Pacifici et al. |
| 2009/0300210 A1 | 12/2009 | Ferris |
| 2009/0300608 A1 | 12/2009 | Ferris et al. |
| 2010/0088150 A1 | 4/2010 | Mazhar et al. |
| 2010/0131392 A1 | 5/2010 | Archer et al. |

OTHER PUBLICATIONS

"Amazon EC2 Instance Types", Amazon.com, Copyright 2010, http://aws.amazon.com/ec2/instance-types/ (no authors cited).

(Continued)

*Primary Examiner* — Scott B Christensen
(74) *Attorney, Agent, or Firm* — William H. Hartwell; Maxine L. Barasch; Keohane & D'Alessandro PLLC

(57) ABSTRACT

Embodiments of the present invention provide an approach to allow a user to link multiple cloud instances (e.g., virtual machines) together such that an action on one (cloud) instance is triggered when a second instance's state changes thereby invoking a predefined set of rules. Specifically, instances can be linked to one another via a graphical user interface (GUI or the like), and associated with a set of rules. The set of rules indicates a behavior/reaction of one instance when an action is performed with respect to another instance linked thereto. These embodiments could be implemented external to or within a cloud operating environment.

20 Claims, 7 Drawing Sheets

(56) References Cited

OTHER PUBLICATIONS

U.S. Appl. No. 12/887,773, Office Action, Jun. 27, 2012, 12 pages.
U.S. Appl. No. 12/887,773, Office Action, Aug. 28, 2012, 11 pages.
U.S. Appl. No. 12/887,773, Office Action, Apr. 11, 2014, 15 pages.
U.S. Appl. No. 12/887,773, Office Action, Oct. 17, 2014, 16 pages.
U.S. Appl. No. 12/887,773, Notice of Allowance, Jan. 20, 2015, 18 pages.

LINKING INSTANCES WITHIN A CLOUD COMPUTING ENVIRONMENT

CROSS-REFERENCE TO RELATED APPLICATIONS

The present patent document is a continuation of U.S. patent application Ser. No. 12/887,773, filed Sep. 22, 2010, entitled "LINKING INSTANCES WITHIN A CLOUD COMPUTING ENVIRONMENT", the disclosure of which is incorporated herein by reference.

TECHNICAL FIELD

The present invention generally relates to instance linking. Specifically, the present invention relates to the linking of instances (e.g., virtual machines) within a cloud computing environment.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices.

Currently, it is difficult in cloud computing environments for users to link (or create relationships) among multiple instances so that the change in status of one instance will be reflected in the status of another instance. Linking instance can be especially important when instances rely upon each other. Today, semantic relationships are not captured as part of instance provisioning. Rather, it is the user that often understands the relationships and roles between virtual machines. As such, the user will typically make the changes manually, or monitor and implement some level of automation external to the operating environment.

SUMMARY

Embodiments of the present invention provide an approach to allow a user to link multiple cloud instances (e.g., virtual machines) together such that an action on one (cloud) instance is triggered when a second instance's state changes thereby invoking a predefined set of rules. Specifically, instances can be linked to one another via a graphical user interface (GUI or the like), and associated with a set of rules. The set of rules indicates a behavior/reaction of one instance when an action is performed with respect to another instance linked thereto. These embodiments could be implemented external to or within a cloud operating environment.

A first aspect of the present invention provides a method for linking instances within a cloud computing environment, comprising: starting a first cloud instance; associating the first cloud instance with a set of rules, the set of rules indicating a reaction of a second cloud instance linked to the first instance when an action is performed with respect to the first cloud instance; performing an action on the first cloud instance; and causing the reaction of the second cloud instance, according to the set of rules, in response to the action.

A second aspect of the present invention provides a system for linking instances within a cloud computing environment, comprising: a bus; a processor coupled to the bus; and a memory medium coupled to the bus, the memory medium comprising instructions to: start a first cloud instance; associate the first cloud instance with a set of rules, the set of rules indicating a reaction of a second cloud instance linked to the first instance when an action is performed with respect to the first cloud instance; perform an action on the first cloud instance; and cause the reaction of the second cloud instance, according to the set of rules, in response to the action.

A third aspect of the present invention provides a computer program product for linking instances within a cloud computing environment, the computer program product comprising a computer readable storage media, and program instructions stored on the computer readable storage media, to: start a first cloud instance; associate the first cloud instance with a set of rules, the set of rules indicating a reaction of a second cloud instance linked to the first instance when an action is performed with respect to the first cloud instance; perform an action on the first cloud instance; and cause the reaction of the second cloud instance, according to the set of rules, in response to the action.

A fourth aspect of the present invention provides a method for deploying a system for linking instances within a cloud computing environment, comprising: deploying a computer infrastructure being operable to: start a first cloud instance; associate the first cloud instance with a set of rules, the set of rules indicating a reaction of a second cloud instance linked to the first instance when an action is performed with respect to the first cloud instance; perform an action on the first cloud instance; and cause the reaction of the second cloud instance, according to the set of rules, in response to the action.

BRIEF DESCRIPTION OF THE DRAWINGS

These and other features of this invention will be more readily understood from the following detailed description of the various aspects of the invention taken in conjunction with the accompanying drawings in which.

Figure 1:
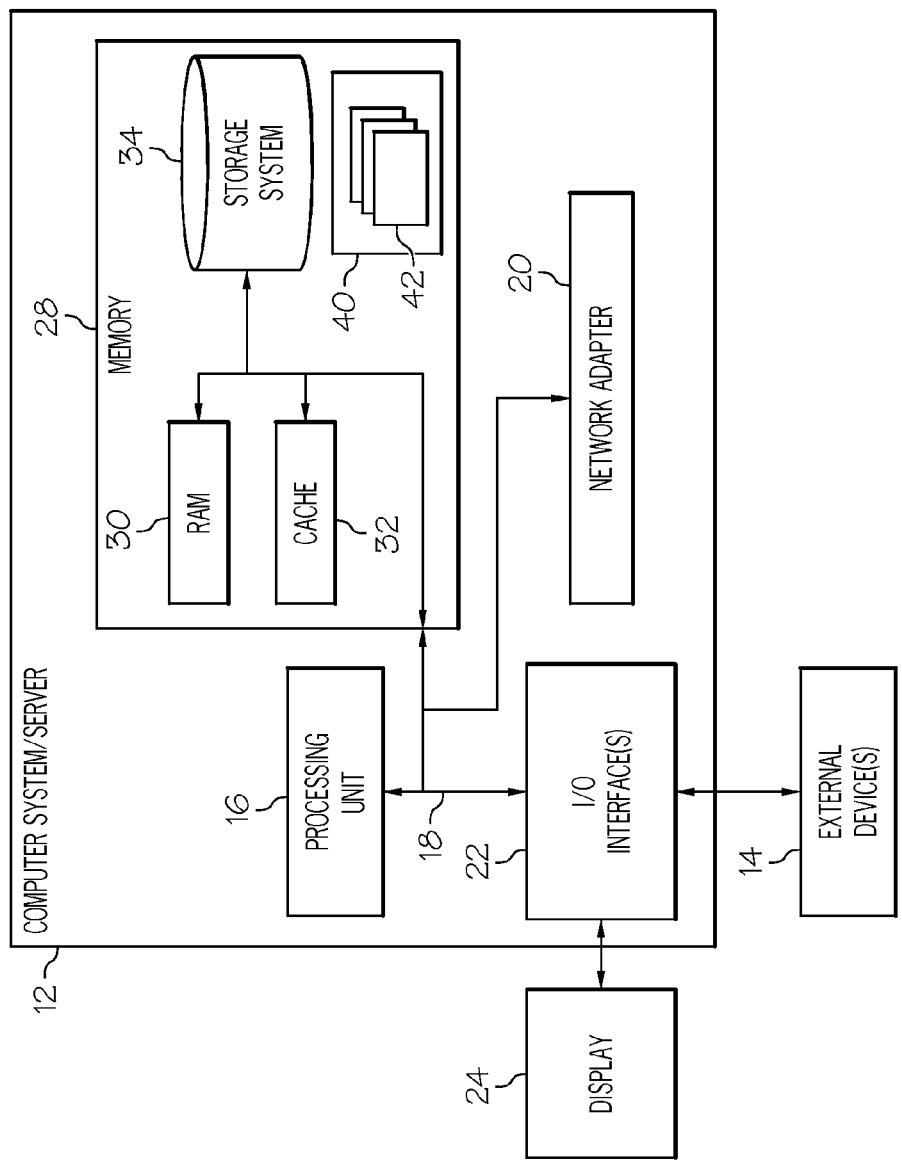
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach to allow a user to link multiple cloud instances (e.g., virtual machines) together such that an action on one (cloud) instance is triggered when a second instance's state changes thereby invoking a predefined set of rules. Specifically, instances can be linked to one another via a graphical user interface (GUI or the like), and associated with a set of rules. The set of rules indicates a behavior/reaction of one instance when an action is performed with respect to another instance linked thereto. These embodiments could be implemented external to or within a cloud operating environment.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing unit 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/ server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
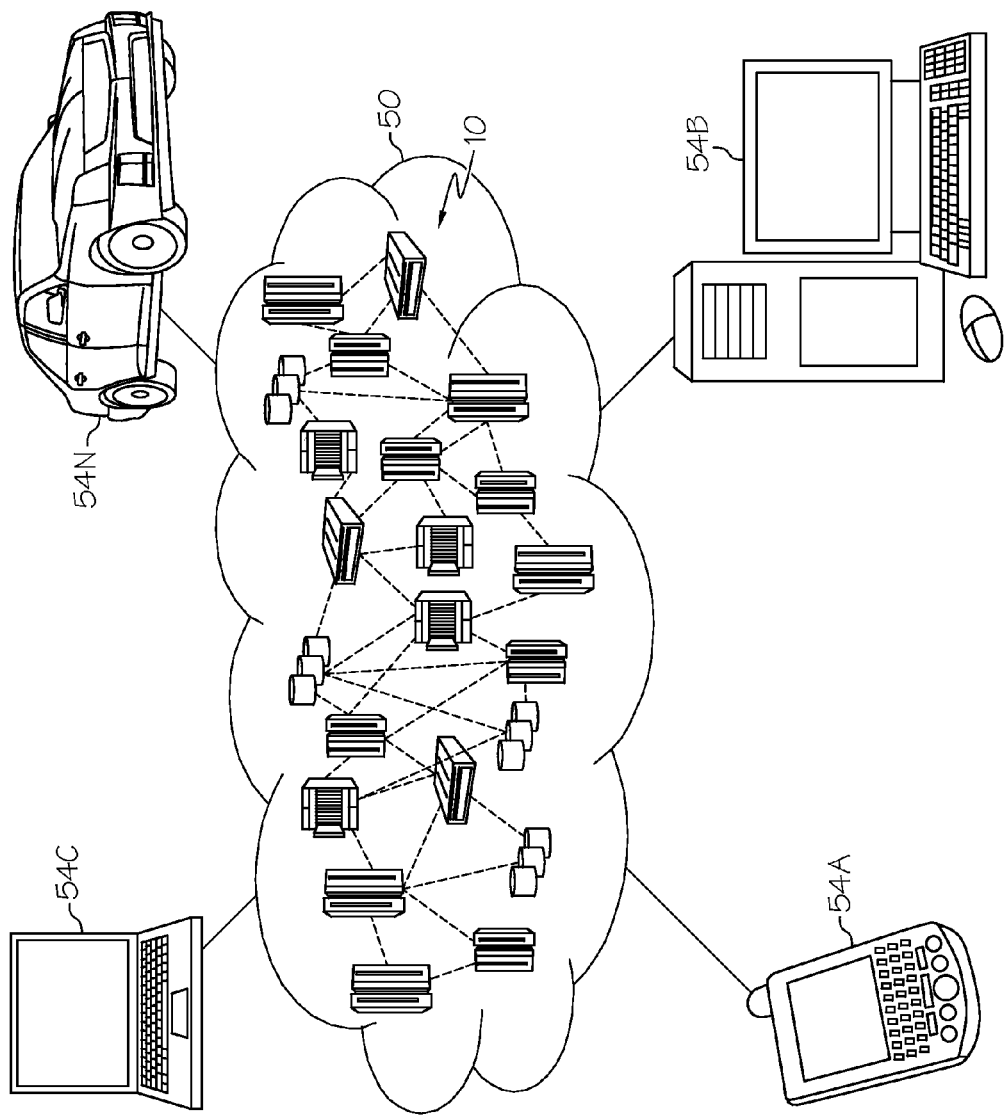
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
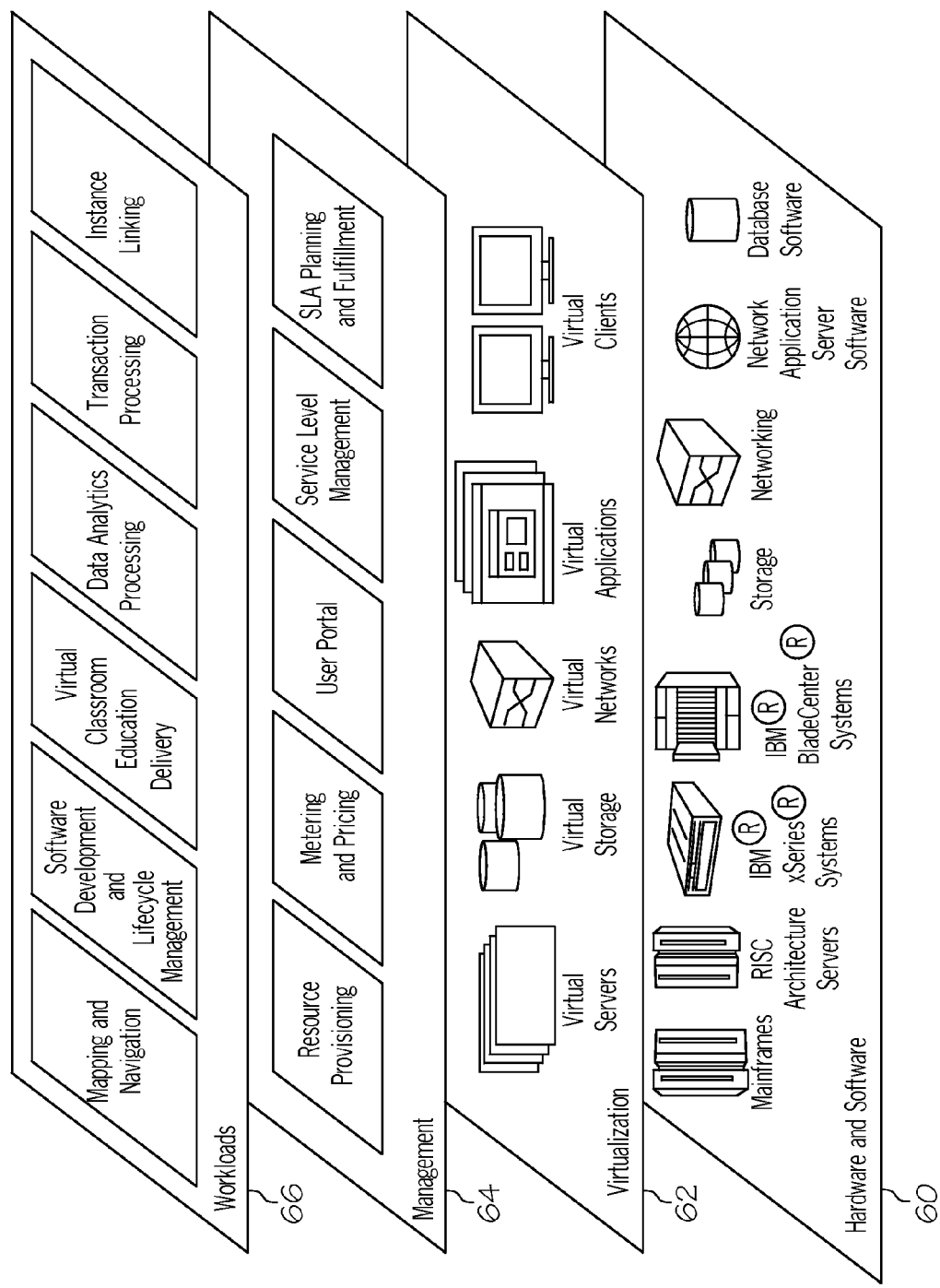
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and instance linking. As mentioned above, all of the foregoing examples described with respect to FIG. 3 are illustrative only, and the invention is not limited to these examples.

It is understood all functions of the present invention as described herein are typically performed by the instance linking, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description of cloud computing, implementation of the teachings recited herein are not limited to a cloud computing environment. Rather, the embodiments of the present invention are intended to be implemented with any type of clustered computing environment now known or later developed.

As indicated above, embodiments of the present invention allow for (among other things) instances to be linked so that when an action is performed with respect to an instance, a corresponding reaction is caused to one or more other instances linked thereto. Typically, such behavior is specified by a set of (predetermined) rules. For example, the set of rules could resemble the following:

1. Restart instance A when instance B is restarted.
2. Delete instance A when instance B is deleted.
3. Start instance A when instance B is started.
4. Start instance A when instance B is stopped.
5. Create new copy of instance B when instance B fails.
6. Create instance A when instance B is active.

Figure 4:
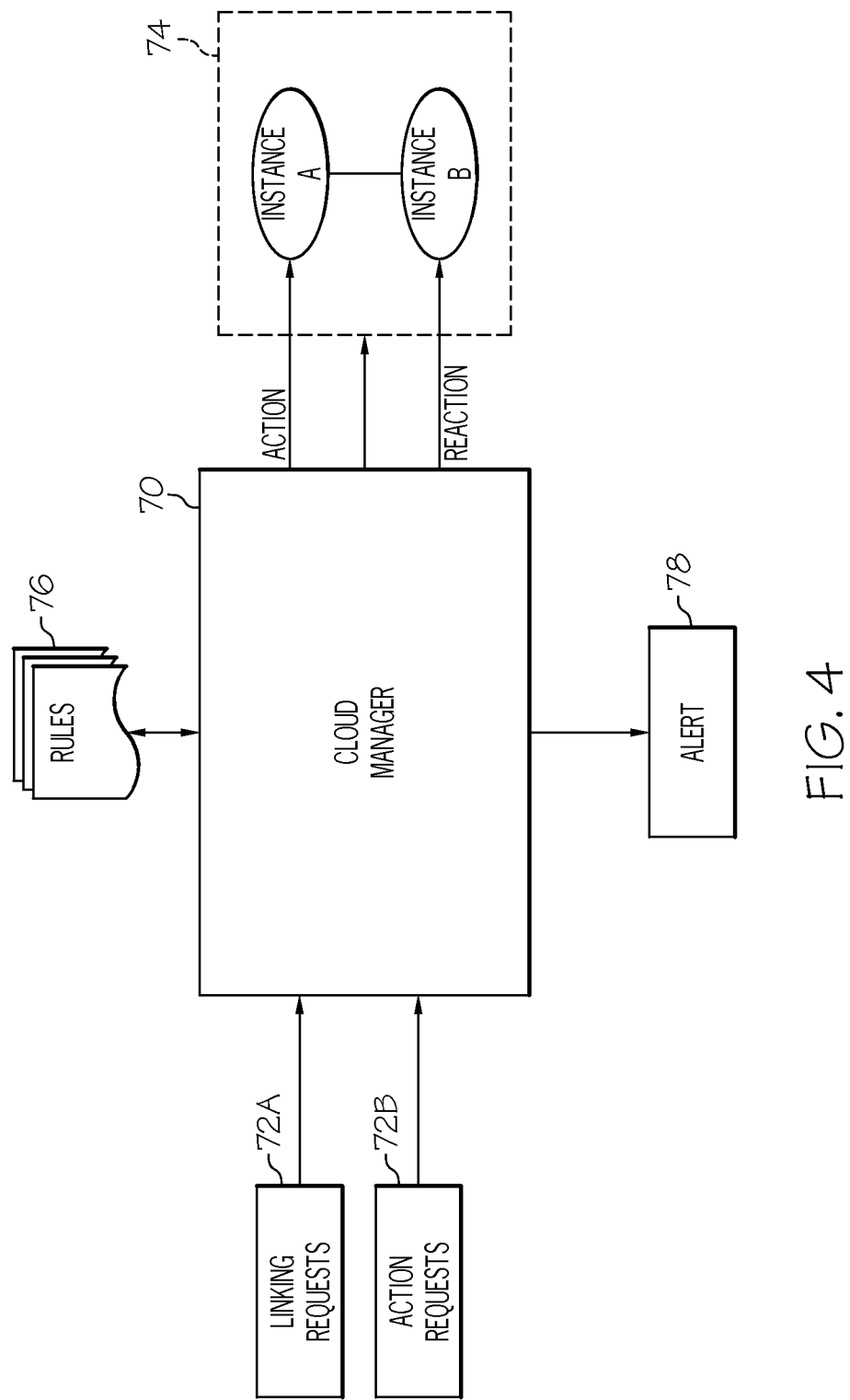
FIG. 4 depicts a cloud manager according to an embodiment of the present invention

Referring now to FIG. 4, these concepts will be explained in greater detail. As depicted, a cloud manager 70 or the like will receive a request to link instances 72A. It is understood that cloud manager 70 could be implemented as a computer program 40 (FIG. 1) having on or more modules 42 (FIG. 1). In this example, a user has requested that instances A and B be linked to one another. Such a request could be made using any approach such as via a graphical user interface (e.g., via a button, a link, a menu option, etc.). The result will be linked instances 74. In addition, cloud manger 70 can access a set of rules 76 that specify how the instances will behave when a change is made to one (e.g., as shown above). Typically, rules 76 are configurable by a user, and can be set forth in any frequency (e.g., perform weekly) or quantity (e.g., perform once) of actions/reactions. As further shown in FIG. 5, assume that an action request for instance A has been received by cloud manager 70. In this case, cloud manager 70 will consult rules 76 to determine whether the action on instance A (e.g., made pursuant to request 72B) should be accompanied by a corresponding reaction on instance B. Cloud manager 70 can then perform (or have performed) any applicable actions/reactions. Furthermore, cloud manager 70 is configured to communicate an alert 78 at any point among processes (e.g., when requests are received, when instances are linked, when rules are changed, when actions/reactions are performed, etc.). Such alert 78 can be made via any means (e.g., via text, email, phone, etc.)

Figure 5:
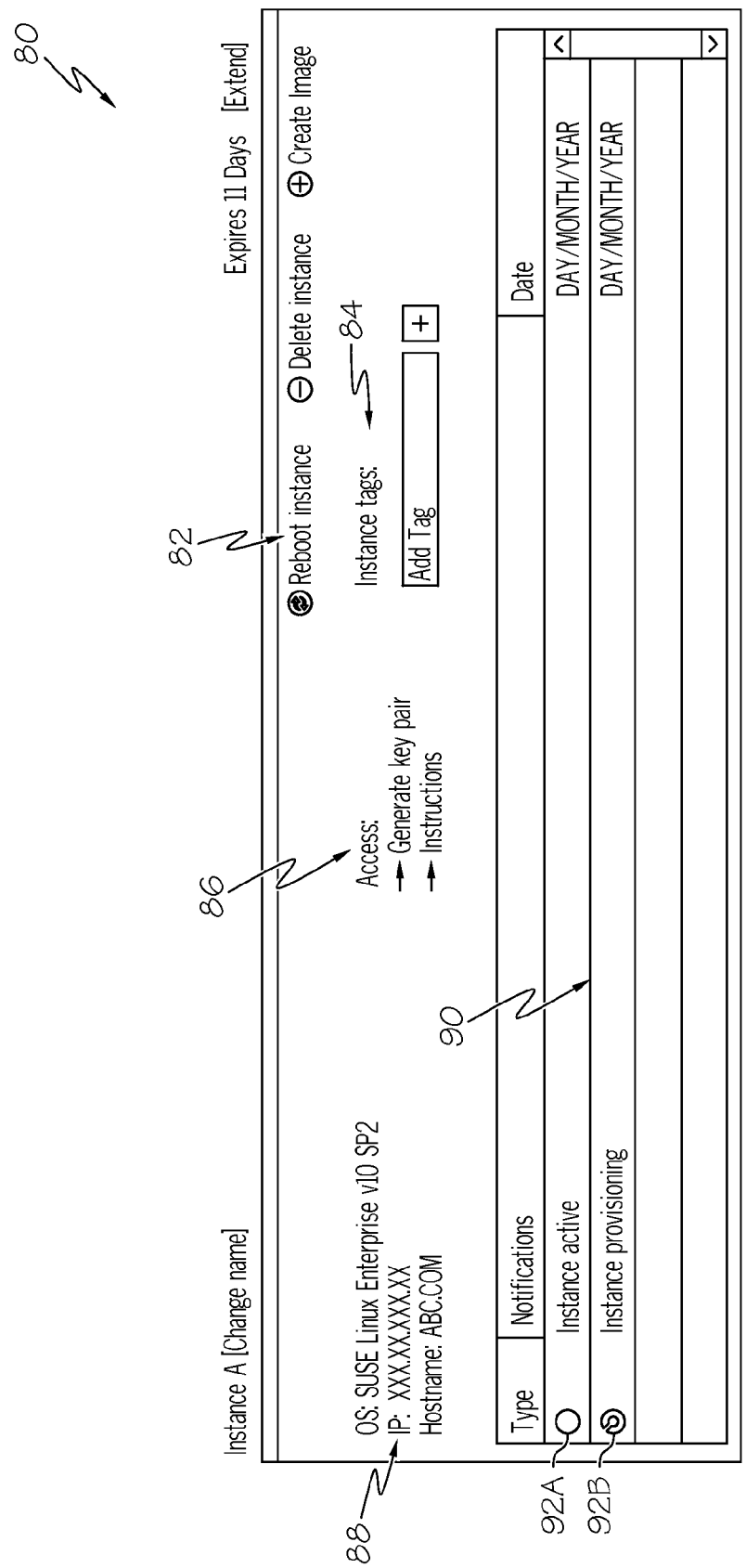
FIG. 5 depicts a first graphical user interface (GUI) showing linked instances according to an embodiment of the present invention.
Figure 6:
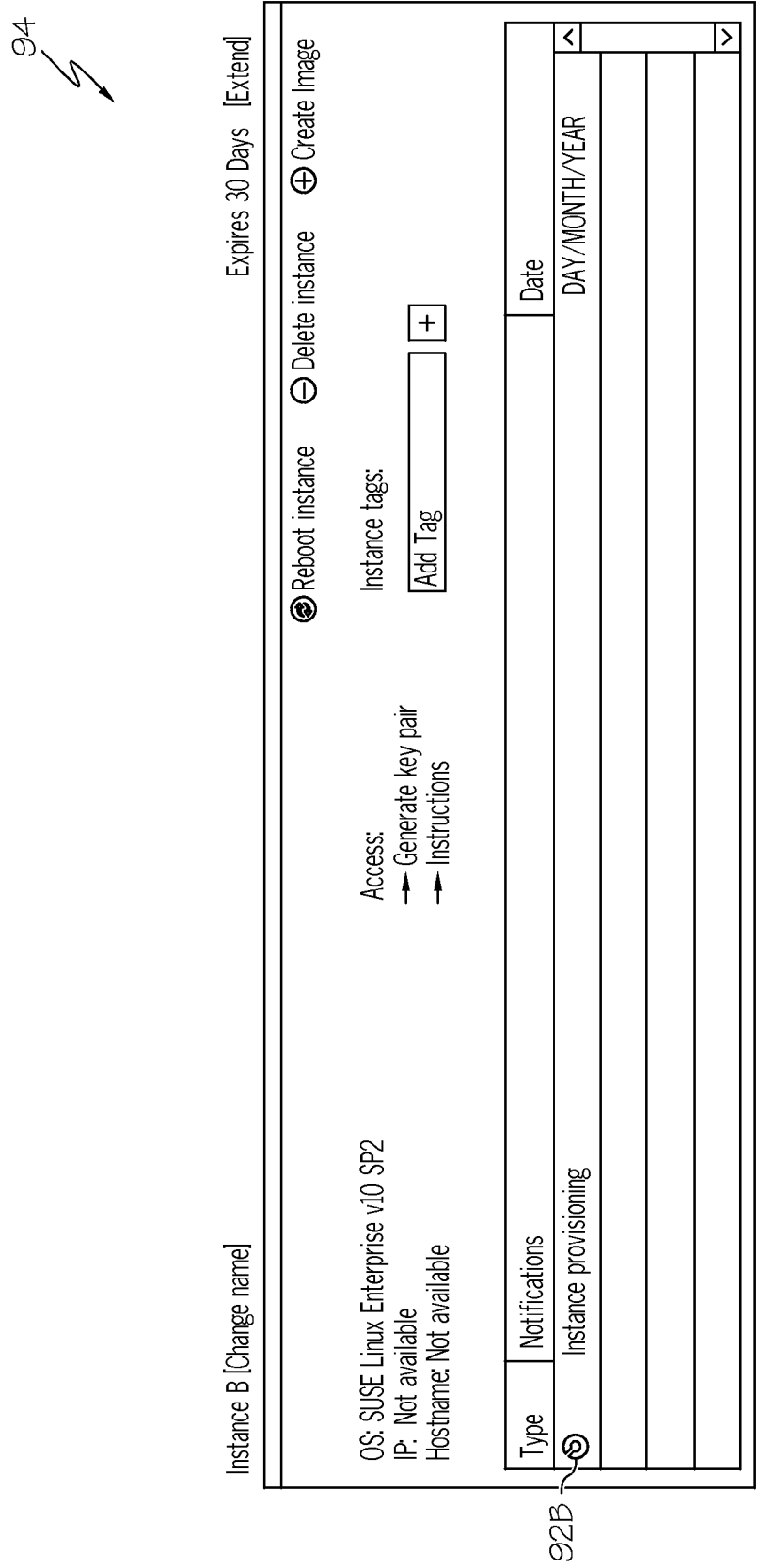
FIG. 6 depicts a second GUI that was provisioned in response to a provisioning of a first instance according to an embodiment of the present invention.

Referring now to FIGS. 5-6, a graphical user interface (GUI 80) illustrating these concepts is shown in greater detail. As shown GUI 80 comprises instance action buttons 82 for performing actions on an instance (e.g., reboot, delete, create, etc.), tag field 84 for tagging instances with keywords or the like, access control buttons 86 for generating security keys or the like, location information 88 (such as operating system, internet protocol (IP) and hostname), and instance fields 90 where instances 92A-B are identified. In this example, the set of rules specify that when an instance 92A is provisioned, a second (mirror) instance 92B is automatically provisioned and linked thereto. A second GUI 94 corresponding to this second instance 90B is shown in FIG. 6. This provides confirmation for the user that instance 90B was in fact provisioned in response to the provisioning of instance 90A.

Figure 7:
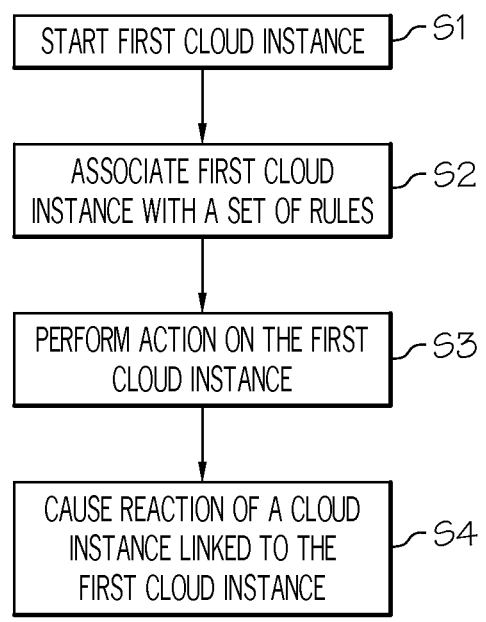
FIG. 7 depicts a method according to an embodiment of the present invention.

Referring now to FIG. 7, a method flow diagram according to the present invention is shown. In step S1, a first cloud instance (e.g., a virtual machine) is started. In step S2, the first cloud instance is associated with a set of rules. As indicated above, the set of rules typically indicates a reaction to be caused with respect to a second cloud instance (e.g., a virtual machine) linked to the first instance when an action is performed with respect to the first cloud instance (e.g., pursuant to a request). Moreover, the set of rules can be generated according to the preferences of a user. Still yet, the two instances can be linked to one another pursuant to an indication made via a graphical user interface (GUI) with the linking being viewable on the GUI. In step S3, an action is performed on the first cloud instance. In step S4, the reaction of the second cloud instance is caused, according to the set of rules, in response to the action. At any point in time, an alert can also be generated and sent to keep the user informed.

While shown and described herein as an instance linking solution, it is understood that the invention further provides various alternative embodiments. For example, in one embodiment, the invention provides a computer-readable/useable medium that includes computer program code to enable a computer infrastructure to provide instance linking functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide instance linking functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for instance linking. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for linking instances within a cloud computing environment, comprising:
   receiving a request to link a second cloud instance with a first cloud instance, the request comprising information for generating a set of rules, the information comprising:
   one or more actions that may be performed with respect to the first cloud instance, and
   for each action of the one or more actions, a corresponding reaction to be performed with respect to a second cloud instance;
   starting a first cloud instance;
   generating, based on the information included in the request, the set of rules, the set of rules defining the corresponding reaction to be performed with respect to the second cloud instance when the each action of the one or more actions is performed with respect to the first cloud instance;
   associating the first cloud instance with the set of rules;
   performing an action on the first cloud instance; and causing the reaction of the second cloud instance, according to the set of rules, in response to the action.

2. The method of claim 1, the action being performed in response to a request.

3. The method of claim 1, the set of rules being generated according to preferences of a user.

4. The method of claim 1, further comprising linking the first cloud instance with the second cloud instance.

5. The method of claim 4, the linking occurring pursuant to an indication made via a graphical user interface (GUI), the linking being viewable on the GUI.

6. The method of claim 1, further comprising generating an alert pursuant to the action and the reaction.

7. The method of claim 1, the first cloud instance and the second cloud instance comprising virtual machines.

8. The method of claim 1, wherein a solution service provider provides a computer infrastructure that performs the method for one or more consumers.

9. A system for linking instances within a cloud computing environment, comprising:
   a bus;
   a processor coupled to the bus; and
   a memory medium coupled to the bus, the memory medium comprising instructions to:
      receive a request to link a second cloud instance with a first cloud instance, the request comprising information for generating a set of rules, the information comprising:
         one or more actions that may be performed with respect to the first cloud instance, and
         for each action of the one or more actions, a corresponding reaction to be performed with respect to a second cloud instance;
      start a first cloud instance;
      generate, based on the information included in the request, the set of rules, the set of rules defining the corresponding reaction to be performed with respect to the second cloud instance when the each action of the one or more actions is performed with respect to the first cloud instance;
      associate the first cloud instance with the set of rules;
   performing an action on the first cloud instance; and
      cause the reaction of the second cloud instance, according to the set of rules, in response to the action.

10. The system of claim 9, the action being performed in response to a request.

11. The system of claim 9, the set of rules being generated according to preferences of a user.

12. The system of claim 9, the memory medium further comprising instructions to link, pursuant to an indication made via a graphical user interface (GUI), the first cloud instance with the second cloud instance, the linking being viewable on the GUI.

13. The system of claim 9, the memory medium further comprising instructions to generate an alert pursuant to the action and the reaction.

14. The system of claim 9, the first cloud instance and the second cloud instance comprising virtual machines.

15. A computer program product for linking instances within a cloud computing environment, the computer program product comprising a computer readable storage media, and program instructions stored on the computer readable storage media, to:
   receive a request to link a second cloud instance with a first cloud instance, the request comprising information for generating a set of rules, the information comprising:
      one or more actions that may be performed with respect to the first cloud instance, and
      for each action of the one or more actions, a corresponding reaction to be performed with respect to a second cloud instance;
   start a first cloud instance;
   generate, based on the information included in the request, the set of rules, the set of rules defining the corresponding reaction to be performed with respect to the second cloud instance when the each action of the one or more actions is performed with respect to the first cloud instance;
   associate the first cloud instance with the set of rules;
   perform an action on the first cloud instance; and
   cause the reaction of the second cloud instance, according to the set of rules, in response to the action.

16. The computer program product of claim 15, the action being performed in response to a request.

17. The computer program product of claim 15, the set of rules being generated according to preferences of a user.

18. The computer program product of claim 15, further comprising program instructions stored on the computer readable storage media to link, pursuant to an indication made via a graphical user interface (GUI), the first cloud instance with the second cloud instance, the linking being viewable on the GUI.

19. The computer program product of claim 15, further comprising program instructions stored on the computer readable storage media to generate an alert pursuant to the action and the reaction.

20. The computer program product of claim 15, the first cloud instance and the second cloud instance comprising virtual machines.

* * * * *